Oct. 21, 1941.    W. W. BOYD    2,259,609
GASKET
Filed April 12, 1940

WITNESSES:
Thomas W. Kerr, Jr.
William Bell, Jr.

INVENTOR:
William W. Boyd,
BY Paul & Paul
ATTORNEYS.

Patented Oct. 21, 1941

2,259,609

UNITED STATES PATENT OFFICE 2,259,609

GASKET

William W. Boyd, Tulsa, Okla., assignor to "Flexitallic" Gasket Company, Camden, N. J., a corporation of New Jersey Application April 12, 1940, Serial No. 329,255

2 Claims. (Cl. 288—32)

This invention relates to gaskets of the spirally wound species and usually composed of a metallic binder strip with an intervening non-metallic or fibrous material filler. Jackets of the indicated type become injuriously affected when subjected to high temperatures and pressures, for example when the filler consists of asbestos it crystallizes around 500° to 550° Fahrenheit. Another disadvantage inhering to such gaskets is the development of leak voids when subject to pressures above 150 pounds due to moisture working through the filler "wick" fashion; this objectionable attribute being more apparent when the gaskets are used in joints subject to the action of oils. To overcome the noted disadvantages it has been proposed to reinforce the gasket by aid of an endless non-compressible ring applied exteriorly and/or interiorly to the gasket, but such means develop a hard "set" in the gasket proper that seriously affects its durability. It has also been proposed to make an all-metal gasket of concentric rings of varying resistance but such gaskets have likewise been subject to objectionable "set" with resultant depreciation in their effectiveness for maintaining a sealed joint.

The primary object of this invention is to overcome all of the above recited disadvantages by providing an all metal spirally-wound gasket embodying a continuous strip binder with an associated filler of dissimilar or softer grade, the former of which retains its compressive resistivity while the latter is leak proof and devoid of "wicking" action.

Another object is to furnish an all metal spirally-wound gasket which positively compacts the filler with the binder, during the winding operation, into a unified mass, and prevents subsequent development of any voids or air-hole during the life of the gasket even when subjected to pressures ranging up to 1000 pounds, and temperatures exceeding 1000° Fahrenheit.

A further object is the provision of a gasket of the above indicated species embodying a special springy binder-strip with a filler that flows under compression and thereby adapts itself to any planar irregularity in the parts between which said gasket is interposed, as well as augmenting its adjustability to different joints, and consequently enhancing the sealing effect.

Subsidiary objects and ancillary advantages of this invention will appear as the nature thereof is better understood, said invention substantially consisting of the respective items employed in the fabrication of the gasket, their combination and correlation as hereinafter disclosed, illustrated by the accompanying sheet of drawings wherein similar reference characters are used throughout the views, and thereafter more particularly defined in the concluding claims.

Figure 1:
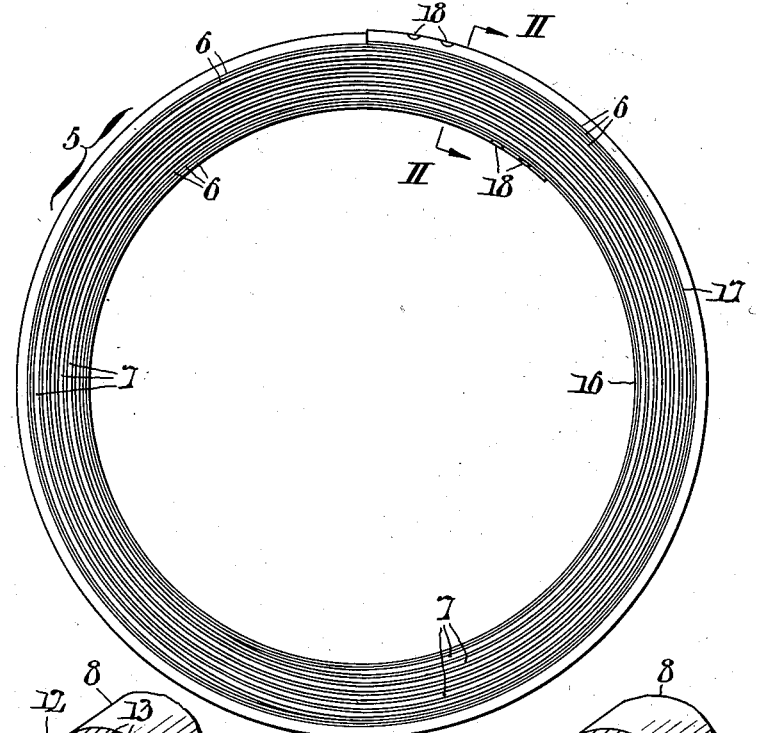
Fig. 1 is a plan view of a gasket constructed in accordance with this invention and ready for insertion into a pipe joint, for instance.

In the following detailed explanation of a preferred embodiment of this invention specific terms will be employed for the sake of clarity; but it is to be understood that such terms are used in a descriptive sense and not for purposes of limitation. Each specific term is intended to include all technical equivalents which may combine and operate in a similar manner to accomplish an analogous purpose.

Referring more in detail to the drawing which has been made from actual specimens, the novel gasket of this invention is comprehensively designated by the reference character 5 and, conveniently, is of annular form. This gasket 5 preferably consists of a continuous stainless steel strip binder 6, wound edgewise in the form of a spiral, with interposed medially abutting aluminum strip fillers 7, simultaneously wound therewith. Although stainless steel strip is specified for the binder 6 and aluminum strip for the filler 7, it is to be expressly understood that other metal strips, as hereinafter mentioned, possessing like properties of springiness and flow capacity, respectively, may be employed.

Figure 2:
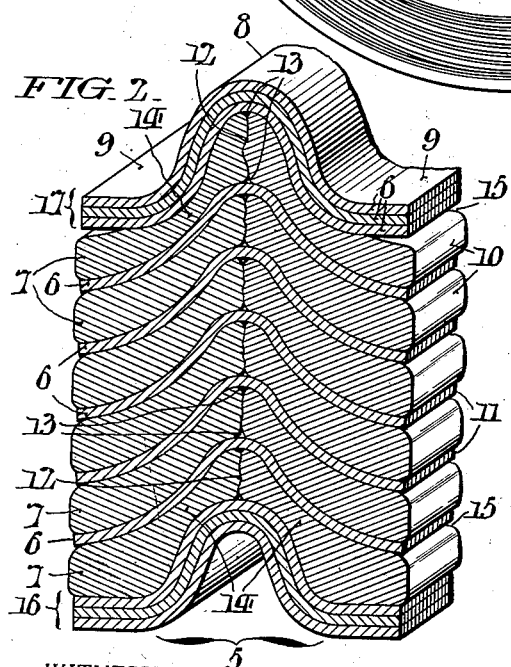
Fig. 2 is a radial section, on an exaggerated scale, taken as indicated by the arrows II—II in the preceding figure.

Prior to forming the gasket 5, the strip binder and fillers 6, 7 are all flat but, incidental to the winding operation, the former is lengthwise shaped to the cross-section shown in Fig. 2, that is to say it is preferably fashioned to define a central corrugation 8 with flanking flats 9 of appropriate dimensions. The concurrently wound strip fillers 7 are fed in to abut medially of the corrugation 8 and become deformed or are caused to flow into the cross-section shown in Fig. 2 with the flanking edges 10 forced outwardly beyond the corresponding edges 11 of the strip binder 6, while the abutted edges approximately assume the undulate formation indicated by the juncture 12, whereby initial continuous spiralized voids 13 of minute proportions result. It is also to be observed that the respective strip fillers 7 are more or less regularly compressed intermediate their edges, as indicated at 14, while continuous edge clearances or grooves 15 intervene the respective binder and filler convolutions.

Figure 3:
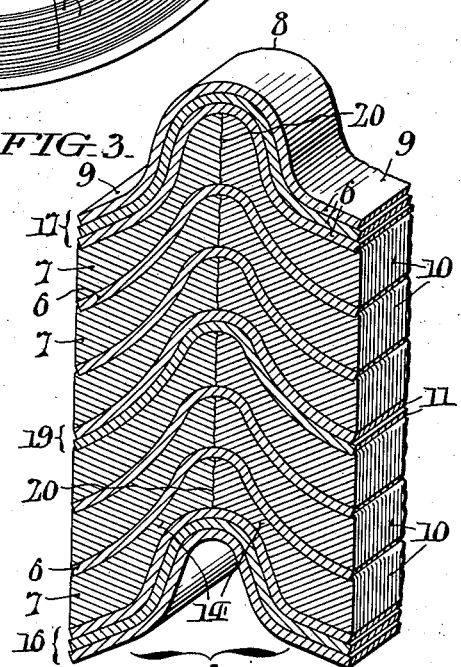
Fig. 3 is a similar section illustrating how the filler strip flows under compression into sealing unification with the binder, as hereinafter fully set forth; said section also showing a minor variation in the winding of the binder to provide an intermediate reinforcement.

In building up or spinning the gasket 5 the strip binder 6 is initially wound upon itself to form overlapping inner convolutions providing a substantially rigid reinforce 16; and correspondingly, when a sufficiency of the strip fillers 7 have been convoluted jointly with the binder 6, to produce the desired diameter of gasket 1, said binder 6 is again wound upon itself to provide an outer substantially rigid reinforce 17; while the respective terminal ends of the binder 6 are clinched at 18 or otherwise permanently connected to the underlying binder. Alternatively the gasket 5 may be provided with one or more intermediate reinforces 19, as shown in Fig. 3, by overlapping convolutions of the binder strip 6, when the gasket is intended for service under extremely high pressures, or is of wide proportions.

When a gasket 5 produced as above set forth is subjected to compression it will be apparent that the strip filler 7 will be inwardly forced relative to both planar surfaces defined by the strip binder edges 11, with resultant mutual expansion to eliminate the hair line voids 13 as well as filling up the edge groovings 15, while the binder 6 still retains its springiness or inherent tendency to oppose the compressive and radial strains, to which such gaskets are generally subjected. In other words, as the gasket 5 is compressed the hair line voids 13 and edge groovings 15 are eliminated with the strip filler abutting edges forced into mutual planar relation as indicated at 20 in Fig. 3. It will likewise be obvious that the greater the degree of compression applied, or the pressure to which the gasket 5 is subjected, the tighter will the binder 6 and filler 7 become unified or bonded, to the total elimination of all interstitial voids or wicking tendency. Otherwise expressed the filler 7 is solidly compacted crosswise of the binder 6 during the entire winding operation so that, when subsequent compressive force is applied the gasket 5 becomes positively non-porous and, by virtue of the character of said filler, is rendered incapable of "wicking."

Although it has been found preferable to use edge-abutting fillers 7 so that they may flow easier during the winding operation; it will be self-evident that a single continuous filler strip of sufficiently malleable type can be equally well employed, in order to produce a leak-proof non-wicking gasket without departing from the fundamentals of this invention. It will furthermore be noted that a gasket 5 produced in accordance with this invention is inherently springy due to the character of the binder 6, which considerably increases its sealing efficiency in use as well as correspondingly extending the life or serviceability; and enabling its re-use when removed from a joint in other capacities.

From the foregoing it will be apparent that by this invention there is provided a gasket 5 composed of dissimilar metals one of which, the binder 6, is inherently springy and tenacious while the other, the filler 7, is softer, malleable and ductile, so as to flow and take a positive set under varied loadings. Again the strip steel binder 6 insures strength resistance in the gasket 5 while the ductile-malleable filler 7 being confined radially of said gasket is forced to flow in a direction parallel to the axis, thereby filling all voids, tool marks, or other irregularities on the faces bearing on the gasket 5 in use; or, in other words, when the gasket 5 is formed there initially exists in both of its flat faces a multiplicity of clearances 15 or restricted spaces which, when said gasket is compressed, are automatically closed and sealed by the flowing filler 7.

Finally it is to be expressly noted that the filler strip 7 may consist of copper, zinc, tin, lead, soft iron, brass or bronze, and various bearing alloys which are compositions, in varying proportions, of any of such metals, according to conditions of service.

Having thus described my invention, I claim:

1. As a new article of manufacture a high pressure all metal spirally-wound gasket comprising a flat steel strip binder component, and a strip filler component of aluminum, said binder component incidental to winding being formed to embody a central corrugation with flanking flats while retaining its inherent compressive resistivity, and the filler component being deformed to entirely fill the space between the binder convolutions and form a unified leak-proof mass devoid of "wicking action" when compressed.

2. The new article of manufacture in accordance with claim 1, further characterized in that the binder component is continuous, and the filler component comprises two lengthwise-adjoining medially-abutted strip elements.

WILLIAM W. BOYD.